Feb. 23, 1937.  K. PAPELLO  2,071,424
APPARATUS FOR FOLLOWING A TARGET
Filed Dec. 11, 1934
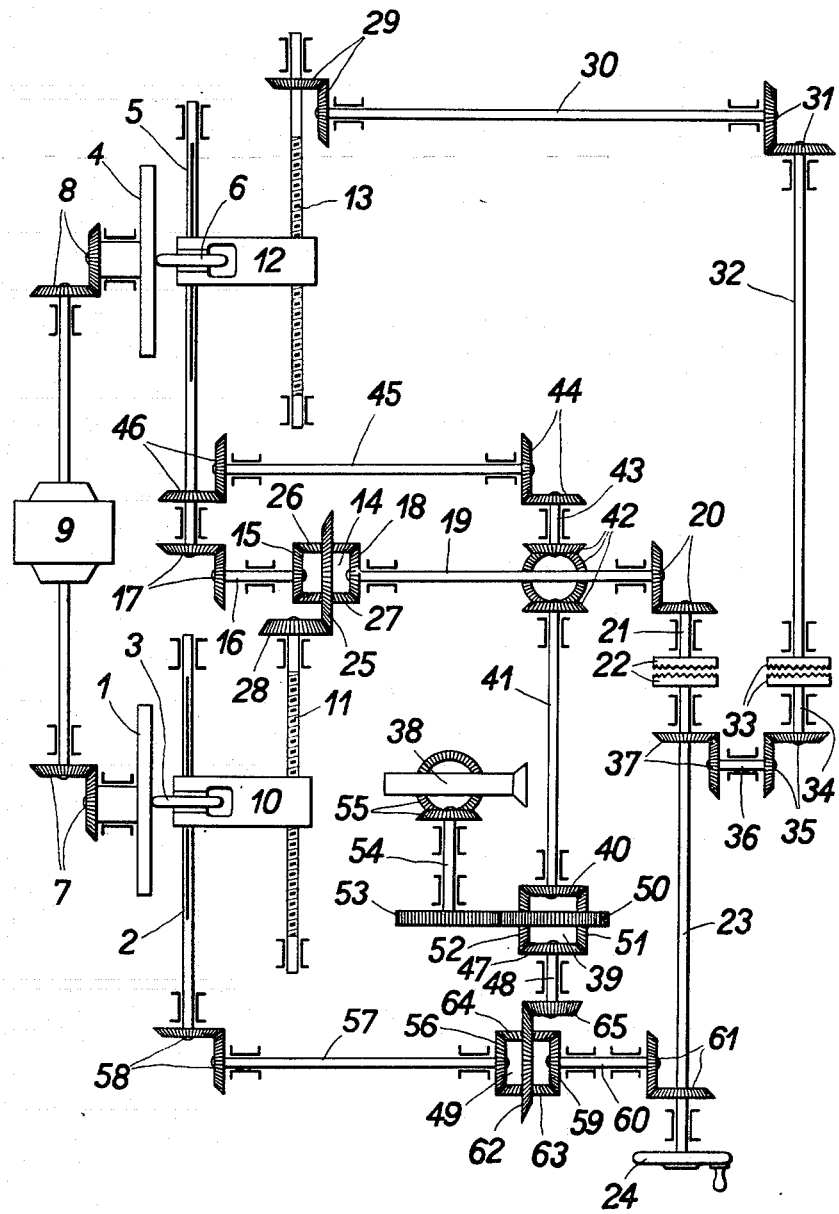
Inventor:
Karl Papello Patented Feb. 23, 1937

2,071,424

UNITED STATES PATENT OFFICE 2,071,424

APPARATUS FOR FOLLOWING A TARGET

Karl Papello, Jena, Germany, assignor to the firm N. V. Nederlandsche Instrumenten Compagnie "Nedinsco" Venlo, Netherlands Application December 11, 1934, Serial No. 757,075
In Germany December 12, 1933

1 Claim. (Cl. 235—61.5)

The invention concerns an apparatus to be used in fire control apparatus, for following a moving target, this apparatus comprising a sighting device movable in a given plane, means for manually moving said sighting device in said plane, a constant speed motor, two variable speed change mechanisms, each having an input shaft, an output shaft and means for adjusting the speed of the output shaft, the input shafts being connected to the said motor for operation thereby, means connecting the output shaft of one speed change mechanism to the sighting device for moving it in said plane, and means connecting the adjusting means of this mechanism to the manual means and to the output shaft of the other speed change mechanism.

The invention provides an apparatus of this kind whose operation may be effected by one hand wheel only and which is therefore very convenient. Experiments have proved that this apparatus may be changed rapidly from hand drive to motor drive also when the angular speed of the sighting line is varying, provided that the adjusting means of the said other speed change mechanism is connected to the said hand wheel and that the output shaft of this other mechanism is connected to the sighting device.

As the motor displacement of the sighting line is apt to be too rapid when the target is begun to be followed, which would entail the necessity of turning the hand wheel forwardly and backwardly, it is advisable to provide a disengaging coupling between the hand wheel and the adjusting device of each of the two speed change mechanisms.

The accompanying drawing represents a schematical top view of an apparatus according to the invention.

The apparatus has two speed change mechanisms. The one of these mechanisms is provided with a friction disc 1 and a friction wheel 3 displaceable along a grooved shaft 2, and the other of these mechanisms is provided with a friction disc 4 and a friction wheel 6 displaceable along a grooved shaft 5. The friction discs 1 and 4 are driven by a motor 9 at constant speed through the agency of bevel wheel gears 7 and 8. The displacement of the friction wheel 3 along the shaft 2 is effected by means of an internally threaded body 10 in mesh with a threaded spindle 11, and the displacement of the friction wheel 6 along the shaft 5 is effected by means of an internally threaded body 12 in mesh with a threaded spindle 13. The threaded spindle 11 is rotated by means of a differential wheel gear 14 whose one crown wheel 15 is disposed on a shaft 16 connected to the shaft 5 by means of a bevel wheel gear 17, and whose other crown wheel 18 is disposed on a shaft 19 which is coupled by means of a bevel wheel gear 20, a shaft 21 and a disengageable coupling 22 to a shaft 23 to which is fixed a hand wheel 24. A bevel wheel 25 transmits the rotations of the two planet wheels 26 and 27 of the differential wheel gear 14 about the axes of the shafts 16 and 19, respectively, to a bevel wheel 28 rigidly connected to the threaded spindle 11. The threaded spindle 13 is coupled to the shaft 23 by means of a bevel wheel gear 29, a shaft 30, a bevel wheel gear 31, a shaft 32, a disengageable coupling 33, a shaft 34, a bevel wheel gear 35, a shaft 36 and a bevel wheel gear 37. 38 designates a sighting telescope which is adjusted by means of a differential wheel gear 39. The one crown wheel 40 of this differential wheel gear 39 is disposed on a shaft 41 which is connected to the shaft 5 by means of a bevel wheel gear 42, a shaft 43, a bevel wheel gear 44, a shaft 45 and a bevel wheel gear 46. The other crown wheel 47 of the differential wheel gear 39 is disposed on a shaft 48 driven by a differential wheel gear 49. A spur wheel gear 50 transmits the rotations of the two planet wheels 51 and 52 of the differential wheel gear 39 about the axes of the shafts 41 and 48, respectively, to the spur wheel 53 of a shaft 54 which is connected by means of a bevel wheel gear 55 to the sighting telescope 38. The one crown wheel 56 of the differential wheel gear 49 is disposed on a shaft 57 which is connected by means of a bevel wheel gear 58 to the shaft 2, and the other crown wheel 59 of the differential wheel gear 49 is disposed on a shaft 60 which is connected by means of a bevel wheel gear 61 to the shaft 23. A bevel wheel 62 transmits the rotations of the two planet wheels 63 and 64 of the differential wheel gear 49 about the axes of the shafts 57 and 60, respectively, to a bevel wheel 65 fixed to the shaft 48.

When making the apparatus ready for following a target, care is to be taken that the two friction wheels 3 and 6 are at the centres of the appertaining friction discs 1 and 4, respectively. To this effect, the hand wheel 24 is to be rotated subsequently to the one or the other of the two couplings 22 and 33 having been disengaged. Now the motor 9 is to be started. When a target is to be followed, the couplings 22 and 33 are disengaged, and the hand wheel 24, which acts on the telescope 38 by means of the members 47 to 55 and 59 to 65, is to be rotated until the image of the target in the telescope coincides with the sighting mark of this telescope. Thereupon, only the coupling 22 of the two couplings 22 and 33 is to be thrown in and the hand wheel 24 is to be so rotated that the image of the target and the sighting mark remain in coincidence. Throwing in the coupling 22 entails that the shaft 23 acts on the threaded spindle 11 by means of the members 18 to 28 and that the friction wheel 3 is removed from the centre of the friction disc 1, the consequence being a rotation of the shaft 2 by the motor 9 and this at an angular speed which depends upon the distance of the friction wheel 3 from the centre of the friction disc 1 and which increases according to the duration of the rotation of the hand wheel 24. As the shaft 2 is connected to the telescope 38 by means of the members 47 to 58 and 62 to 65, the telescope is not only driven by the hand drive but also by the motor, the motor influence increasing more and more and, when the movement of the sighting line to the target has a constant angular speed, becoming so strong that a further manipulation of the hand wheel 24 is superfluous. When the angular speed of the sighting line is constant, the coupling 33 need not be thrown in at all. When however the angular speed of the sighting line to the target is variable, which the observer at the telescope 38 notices by the fact that the hand wheel 24 cannot be stopped without losing the target, he makes additional use of the coupling 33. Accordingly, rotating the hand wheel 24 entails a rotation of the threaded spindle 13 of the friction wheel gear 4, 6. This rotation of the spindle 13 causes the shaft 5 to be rotated by the motor 9, and that, on the one hand, on account of the connecting of the shaft 5 to the telescope 38 by the members 39 to 46 and 50 to 55, the telescope is displaced also by the motor and that, on the other hand, on account of the shaft 5 being connected to the threaded spindle 11 by the members 15 to 17 and 25 to 28, there is imparted to the threaded spindle 11 an additional rotation, the angular speed of the shaft 2 being thus increased. When the acceleration of the speed of the sighting line to the target is constant, the hand wheel 24 may be brought to a standstill very soon, that is to say if the two couplings 22 and 33 are engaged. When neither the angular speed nor the acceleration of the sighting line to the target is constant, because the adjustment of the telescope by the motor alone is not sufficient for keeping the sighting mark and the image of the target in coincidence, the hand wheel 24 is to be manipulated continuously.

I claim:

In an apparatus for following a target, a sighting device movable in a given plane, means for manually moving said sighting device in said plane, a constant speed motor, two variable speed change mechanisms, each having an input shaft, an output shaft and means for adjusting the speed of the output shaft, the input shafts being connected to the said motor for operation thereby, means connecting the output shaft of each mechanism to the sighting device for moving it in said plane, means for coupling the adjusting means of each speed change mechanism to the manual means, and means connecting the output shaft of one of the speed change mechanisms to the adjusting means of the other.

KARL PAPELLO.